United States Patent
Shah et al.

(10) Patent No.: US 9,953,543 B2
(45) Date of Patent: Apr. 24, 2018

(54) SECURED COMPUTER BASED ASSESSMENT

(71) Applicant: Tata Consultancy Services Limited, Mumbai, Maharashtra (IN)

(72) Inventors: Viral Prakash Shah, Maharashtra (IN); Nawaz Mohammed Shaikh, Maharashtra (IN); Rohit Kumar, Maharashtra (IN)

(73) Assignee: Tata Consultancy Services Limited, Mumbai (IN)

( * ) Notice: Subject to any disclaimer, the term of this patent is extended or adjusted under 35 U.S.C. 154(b) by 427 days.

(21) Appl. No.: 14/088,655

(22) Filed: Nov. 25, 2013

(65) Prior Publication Data
US 2014/0186812 A1 Jul. 3, 2014

(30) Foreign Application Priority Data
Dec. 27, 2012 (IN) .......................... 3711/MUM/2012

(51) Int. Cl.
*G09B 7/00* (2006.01)
*G09B 7/02* (2006.01)

(52) U.S. Cl.
CPC ...... *G09B 7/00* (2013.01); *G09B 7/02* (2013.01)

(58) Field of Classification Search
CPC ...................................................... G09B 7/00
USPC ...................................... 434/319, 322, 350
See application file for complete search history.

(56) References Cited

U.S. PATENT DOCUMENTS

| 2007/0042335 A1* | 2/2007 | Tidwell-Scheuring .. G09B 7/00 434/350 |
| 2007/0048723 A1* | 3/2007 | Brewer ................... G09B 7/02 434/350 |
| 2007/0117083 A1 | 5/2007 | Winneg et al. |
| 2008/0293033 A1 | 11/2008 | Scicchitano et al. |
| 2011/0207108 A1* | 8/2011 | Dorman ................... G09B 7/00 434/350 |
| 2012/0176220 A1* | 7/2012 | Garcia .................... G06F 21/32 340/5.83 |

FOREIGN PATENT DOCUMENTS

WO 2008121730 10/2008

OTHER PUBLICATIONS

Aditi Bal et al, Biometric Authentication and Tracking System for Online Examination System, IEEE—2011 International Conference on Recent Trends in Information Systems, Dec. 21, 2011, p. 209-213.

* cited by examiner

*Primary Examiner* — Xuan Thai
*Assistant Examiner* — Robert P Bullington
(74) *Attorney, Agent, or Firm* — Banner & Witcoff, Ltd.

(57) ABSTRACT

Systems and methods for secured computer based assessment are described. In one embodiment, the method comprises capturing of proctoring data at a candidate assessment device from a candidate at predefined time intervals during an examination. The proctoring data includes biometric data, still image, and surround sound associated with the at least one candidate. The proctoring data captured at the candidate assessment device is then transmitted to a central assessment server connected to the candidate assessment device. At the central assessment server, the proctoring data is compared with registration data, of the candidate, stored in the central assessment server. Based on the comparison, malpractice by the candidate during the examination is determined when the proctoring data deviates from the registration data.

12 Claims, 3 Drawing Sheets

SECURED COMPUTER BASED ASSESSMENT

TECHNICAL FIELD

The present subject matter relates, in general, to computer based assessments, and particularly, but not exclusively, to methods and systems for conducting a secured computer based assessment.

BACKGROUND

A standard procedure used for measuring a candidate's competency in almost all the environments, such as academic and corporate environment is through assessments or examinations. Due to added cost and complexity of traditional paper based assessments, computer based assessments, typically referred to as online assessments, have emerged as a popular and convenient method for administering and processing the assessments. For example, assessments that are conducted at a large scale, such as GRE, GMAT, SAT, TOEFL, LSAT, CAT, AIEEE, and other similar assessments that require more time and efforts in administration and processing, are now conducted online.

The general acceptability of computer based assessments in academic as well as corporate sectors is mostly due to ease of use and reduced time and effort in conduction and evaluation of the assessments. However, increasing use of online assessment has given rise to a number of issues related to security and integrity of the assessment. Maintaining integrity of the assessment becomes even more burdensome when the assessment is conducted at a large scale at several distributed examination centers.

SUMMARY

This summary is provided to introduce concepts related to method(s) and system(s) for conducting a secured computer based assessment, which is further described below in the detailed description. This summary is neither intended to identify essential features of the claimed subject matter nor is it intended for use in determining or limiting the scope of the claimed subject matter.

Method(s) and System(s) for conducting a secured computer based assessment by an assessment assistance center are described herein. In one embodiment, the method comprises capturing of proctoring data at a candidate assessment device from a candidate at predefined time intervals during an examination. The proctoring data includes biometric data, still image, and surround sound associated with the at least one candidate. The proctoring data captured at the candidate assessment device is then transmitted to a central assessment server connected to the candidate assessment device. At the central assessment server, the proctoring data is compared with registration data of the candidate, stored in the central assessment server. Based on the comparison, malpractice by the candidate is during the examination is determined when the proctoring data deviates from the registration data.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
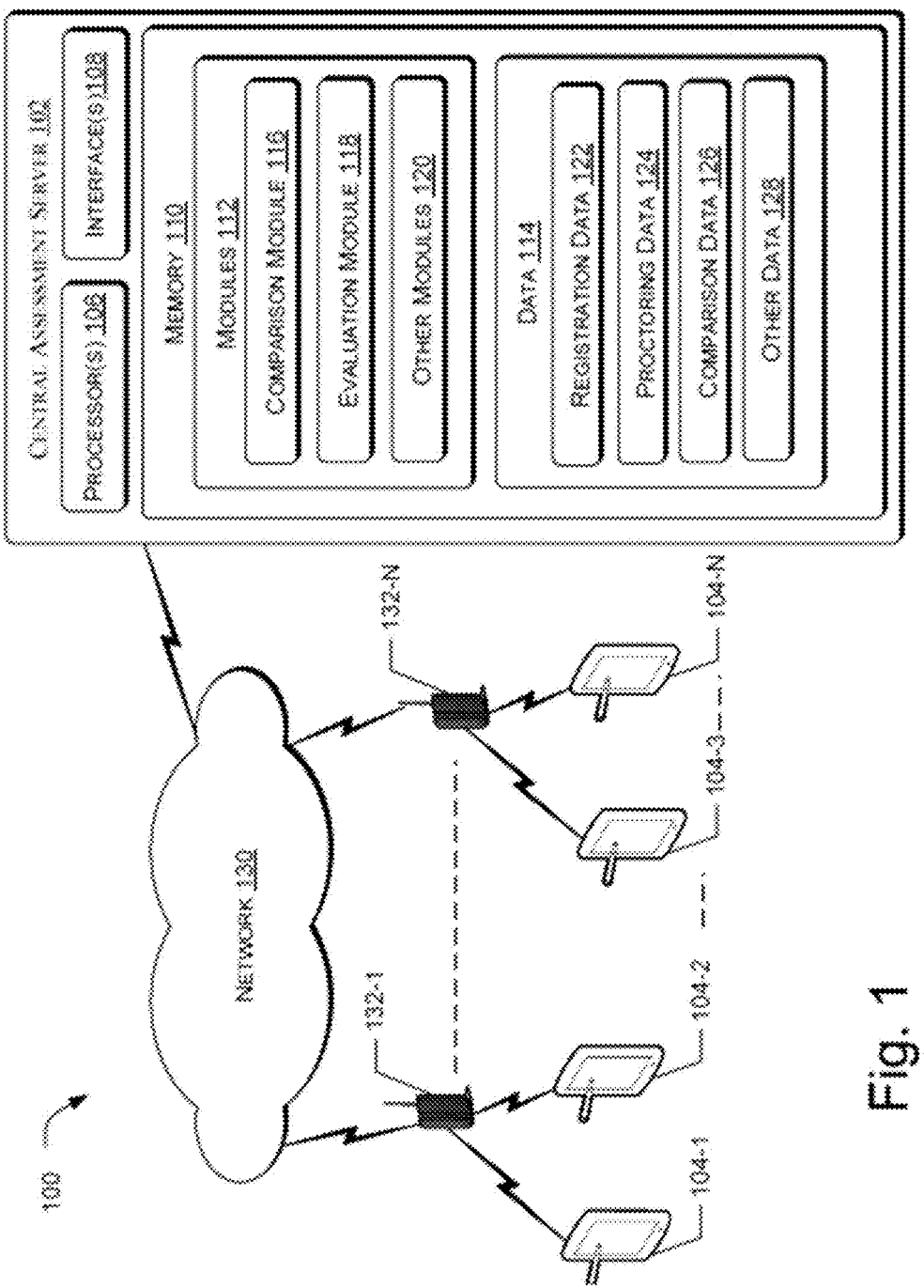
FIG. 1 illustrates a secured assessment system, in accordance with an embodiment of the present subject matter.

In the recent years, computer based assessment has emerged as a popular and widely adopted mode of conducting various academic and corporate assessments. Computer based assessment is generally a mode of assessment where questions appear on the screen of a computing system and aspirants submit their answers using an input device, such as keyboard and/or mouse. Such type of assessment offers significant advantages over traditional paper based assessments like flexibility, agility, efficiency, reduced time in evaluation, and cost savings in printing, storage, and transportation of the question papers to distributed examination centers.

Conducting such computer based assessment at a large scale typically requires test centers. Such test centers may include a plurality of computer workstations for conducting examinations of candidates. The tests centers having computer workstations are usually not readily available for conducting exams. Further, it is difficult to organize the computer workstations to conduct exam at large scale, for example, in which 300 to 400 workstations are required per test center. To this end, handheld computing devices are used these days as candidate console for conducting online, secure and large scale exams. However, such handheld computing devices facilitate candidates to rely on unfair practices during the examination by just exchanging the handheld computing device with other candidates. Moreover, such handheld computing devices work on wireless network, such as Wi-Fi, the security of the wireless network and the secure configuration of all the handheld computing devices is difficult to manage.

In accordance with the present subject matter, methods and systems are provided for conducting a secured computer based assessment, wherein the assessment can be conducted by means of a secured handheld candidate assessment device. Such candidate assessment device is used as a candidate console for conducting online, secure, and large scale assessments. The candidate assessment device can be a tablet or Personal Digital Assistant (PDA) device with specific user interface and network features for conducting assessments of any kind. Further, by using a handheld candidate assessment device for conducing online assessments, considerable financial resource are saved and dependency on specialized test centers is minimized.

In one embodiment, the present subject matter provides a method for conducting a secured computer based assessment using a handheld candidate assessment device equipped with in-built security features, such as an in-built sensor for capturing biometric data, an in-built camera for capturing still image, and an in-built sound sensitive recorder for capturing surround sound. These in-built features enable the candidate assessment device to be used in more secure manner while conducting an examination. In said embodiment, the candidate assessment device receives registration data from a candidate before the beginning of an examination. The registration data includes, but is not limited to biometric data, retinal scans, still image, a sample surround sound associated with the candidate. The biometric data may include at least one of finger prints, thumb prints, and palm prints. The received registration data is then transmitted to and stored at a central assessment server.

Once the registration data is stored at the central assessment server, proctoring data is captured by the candidate assessment device, at predefined time intervals, during examination. Each time the proctoring data is captured, the proctoring data is transmitted to the central assessment server. At the central assessment server, the proctoring data is compared with the already stored registration data, to determine malpractice by the candidate during examination. This process of comparison is carried out at regular predefined time intervals, such as at the beginning of an examination, at check-out for breaks, at check-in from breaks, at regular time intervals during examinations, and at the end of an examination. If at any point of time, the proctoring data deviates from the registration data, a candidate associated with the candidate assessment device is identified for doing malpractices during the examination.

The above method(s) and system(s) are further described in conjunction with the following figures. It should be noted that the description and figures merely illustrate the principles of the present subject matter. It will thus be appreciated that those skilled in the art will be able to devise various arrangements that, although not explicitly described or shown herein, embody the principles of the present subject matter and are included within its spirit and scope. Furthermore, all examples recited herein are principally intended expressly to be only for pedagogical purposes to aid the reader in understanding the principles of the present subject matter and the concepts contributed by the inventor(s) to furthering the art, and are to be construed as being without limitation to such specifically recited examples and conditions. Moreover, all statements herein reciting principles, aspects, and embodiments of the present subject matter, as well as specific examples thereof, are intended to encompass equivalents thereof.

FIG. 1 illustrates a secured assessment system 100 implementing a central assessment server 102 coupled to a plurality of candidate assessment devices 104-1, 104-2, 104-3, . . . , 104-N, collectively referred to as candidate assessment devices 104, according to an embodiment of the present subject matter. The central assessment server 102 is configured for conducting a secured computer based assessment. In an implementation, the central assessment server 102 is implemented by an assessment conducting body. The assessment conducting body may be an educational body like schools and colleges that conducts tests for admitting students, conducting examinations and hiring faculty, or a recruitment agency like a bank, a government body like public sector undertakings that conduct tests for hiring employees, promoting employees, appraisal purposes etc. In another implementation, the central assessment server 102 can also be implemented at a test center location remote from the assessment conducting center.

Further, in one implementation, the central assessment server 102 may be implemented as a workstation, a distributed server, a network server, and the like.

In one implementation, the central assessment server 102 includes a processor(s) 106. The processor(s) 106 may be implemented as one or more microprocessors, microcomputers, microcontrollers, digital signal processors, central processing units, state machines, logic circuitries, and/or any devices that manipulate data based on operational instructions. Among other capabilities, the processor(s) is configured to fetch and execute computer-readable instructions stored in a memory.

Also, the central assessment server 102 includes interface(s) 108. The interface(s) 108 may include a variety of software and hardware interfaces that allow the central assessment server 102 to interact with the entities of a network. The interface(s) 108 may facilitate multiple communications within a wide variety of networks and protocol types, such as IoT network, including wire networks, for example, LAN, cable, etc., and wireless networks, for example, WLAN, cellular, satellite-based network, etc. The interface(s) 108 also allows communication of data from one ore more biometric sensors or the like.

The central assessment server 102 may also include a memory 110. The memory 110 may be coupled to the processor(s) 106. The memory 110 can include any computer-readable medium known in the art including, for example, volatile memory, such as static random access memory (SRAM), and dynamic random access memory (DRAM), and/or non-volatile memory, such as read only memory (ROM), erasable programmable ROM, flash memories, hard disks, optical disks, and magnetic tapes.

Further, the central assessment server 102 may include a module(s) 112 and a data 114. The module(s) 112 may be coupled to the processor(s) 106 and amongst other things, may include routines, programs, objects, components, data structures, etc., which perform particular tasks or implement particular abstract data types. The module(s) 112 may also be implemented as, processor(s), state machine(s), logic circuitries, and/or any other device or component that manipulates signals based on operational instructions.

The module(s) 112 includes a comparison module 116, an evaluation module 118, and other module(s) 120. The other module(s) 120 may include programs or coded instructions that supplement applications and functions of central assessment server 102. It will be appreciated that such modules may be represented as a single module or a combination of different modules.

In one implementation, the data 114 serves, amongst other things, as a repository for storing data processed, received and generated by one or more of the modules 112. The data 114 includes, for example, a registration data 122, a proctoring data 124, a comparison data 126, and other data 128. In one implementation, the registration data 122, the proctoring data 124, the comparison data 126, and the other data 128 may be stored in the memory 110 in the form of data structures.

Although, FIG. 1 depicts only one data repository or data 114, in an implementation, the central assessment server 102 may be communicatively coupled to more than one data repository. Further, the data repository or data 114 is depicted as internal repository within the central assessment server 102. It is to be understood that the data repository or data 114 may also be implemented an external repository communicatively coupled to the central assessment server 102.

Further, the central assessment server 102 is communicatively coupled, over a network 130, to one or more master control devices 132-1, 132-2, . . . 132-N, collectively referred to as master control devices 132.

The network 130 may be a wireless or a wired network, or a combination thereof. In an example, the network 130 can be implemented as a computer network, as one of the different types of networks, such as virtual private network (VPN), intranet, local area network (LAN), wide area network (WAN), the internet, and such. The network 130 may either be a dedicated network or a shared network, which represents an association of the different types of networks that use a variety of protocols, for example, Hypertext Transfer Protocol (HTTP), Transmission Control Protocol/ Internet Protocol (TCP/IP), and Wireless Application Protocol (WAP), to communicate with each other. Further, the network 130 may include a variety of network devices, including routers, bridges, servers, computing devices, storage devices. The network devices within the network 130 may interact with the central assessment server 102 through communication links.

In one implementation, the master control devices 132 may be further connected to the plurality of candidate assessment devices 104, over a network, for example, wireless local area network (WLAN), such as Wi-Fi.

In accordance with the present subject matter, upon arrival of the aspirants or the candidates at a test center, the candidates are requested to provide the registration data 122 through the candidate assessment devices 104. In an implementation, the candidate assessment devices 104 are provided or implemented at a test center. The test center is a place where the plurality of aspirants or candidates gathers on a specific date and time as communicated by the various exam conducting bodies to appear for the assessment. The assessment conducting bodies, as mentioned earlier, may include educational body like schools and colleges that conducts tests for admitting students, conducting examinations and hiring faculty, or a recruitment agency like a bank, a government body like public sector undertakings that conduct tests for hiring employees, promoting employees, appraisal purposes etc.

In one implementation, before the beginning of an examination, the registration data 122 is received by the candidate assessment device 104 from a candidate. The registration data 122, as described earlier, may include biometric data, still image, a sample sound associated with the candidates. In order to receive the registration data 122, each candidate assessment device 104 is embodied with an in-built sensor, an in-built camera, and an in-built sound sensitive recorder. The registration data 122 received by the candidate assessment devices 104 is transmitted to the central assessment server 102.

In one implementation, the comparison module 116 of the central assessment server 102 is configured to receive registration data 122 at the beginning of an examination, in order to register the candidates or validate identity of the candidates based on the data previously stored in the central assessment server 102. The previously stored data associated with a candidate is available, in case the candidate has already been enrolled by the exam conducting bodies prior to the examination or the candidate has previously sat for an examination conducted by the same exam conducting body.

In case the candidate registration fails for a candidate, the candidate assessment device 104 provided to that candidate gets locked and the candidate is prevented from attending the examination. The registration of the candidate may fail, in case any invalidating event occurs. An invalidating event could be, for example, the presence of two persons or candidates in a test center, or an attempt to improperly or fraudulently enter registration data 122. Typically, the types of occurrences or data which would constitute invalidating events would vary depending on the particular test and level of security required.

Further, in case there is no invalidating event and the candidate is registered or verified as a valid registrant or candidate, then the test question data is communicated to the candidate assessment device 104 present at the test center. A candidate may attempt the examination by entering the response to the question data displayed on a display screen of the candidate assessment device 104.

Once the candidate begins responding to the question data display on the screen of the candidate assessment device 104, the capturing of the proctoring data 124, including biometric data, still image, and sound data, at regular predefined time intervals, begins at candidate assessment devices 104 during the examination. The captured proctoring data 124 captured by the candidate assessment devices 104 is transmitted to the central assessment server 102 via the master control devices 132.

In one embodiment, software or modules running on the central assessment server 102 controls the master control devices 132, in order to allow or block the candidate assessment devices 104. In said embodiment, the comparison module 116 of the central assessment server 102 is configured to receive the proctoring data 124 at the predefined time intervals during the examination. The comparison module 116 is further configured to compare the proctoring data 124 with the registration data 122, at predefined time intervals to determine malpractice by the candidate during examination. This process of comparison is carried out at regular predefined time intervals, such as at the beginning of an examination, at check-out for breaks, at check-in from breaks, at regular time intervals during examinations, and at the end of an examination. Based on the comparison, a comparison data 126 is generated and stored in the data 114.

The comparison data 126 outputted by the comparison module 116 is then evaluated by the evaluation module 118. The evaluation module 118 is configured to evaluate the comparison data 126 at regular predefined time intervals, in order to determine the deviation of the proctoring data 124 from the registration data 122 and to identify one or more candidates performing misconduct during the examination. If at any point of time, the evaluation of the comparison data 126 for a candidate deviates above a permitted limit, then the capturing of the proctoring data 124 is stopped and/or the master control devices 132 are communicated to block or lock the candidate assessment device 104 allocated to a candidate who is identified for doing malpractices during the examination.

In case no invalidating event occurs, or the comparison data 126 is evaluated below the permitted limit, during or at the conclusion of the examination process, all the relevant data is transmitted to the central assessment server 102. Such data may include, but not limited to, test response data, audio/visual proctoring data, a still picture of the candidate, and registration data. If, as described above, all the proctoring events are validated at regular predefined time intervals during the examination, it is ensured that the same examination candidate began the exam, present after each break, and terminate the exam.

Further, for conducting a secured computer based assessment using the secured assessment system 100, there is one major operational challenge in handing the plurality of candidate assessment devices 104 in a test center. As each candidate assessment device 104 needs to be connected to the central assessment server 102 over the local WLAN and the internal protocol (IP) address of the central assessment server 102 can change in each test center, it becomes very difficult and a time consuming activity to make the Wi-Fi or WLAN secure. Further, extra routers or boosters need to configure to ensure that all the candidate assessment devices 104 are getting enough bandwidth to connect to the central assessment server 102. To avoid all these operational challenges and increase the security of the candidate assessment devices 104, the master control devices 132 are configured to act both as a Wi-Fi router and also as the controller for all the candidate assessment devices 104 paired with it. The master control devices 132 are connected to the central assessment server 102 and provide a pathway for network connectivity between the central assessment server 102 and the candidate assessment devices 104. The candidate assessment devices 104 upon startup look for their master control devices 132 and will not start at all in case no master control devices 132 are found.

Further, in one implementation, the central assessment server 102 has a white listing feature that enables, only the configured master control devices 132 or the candidate assessment devices 104, to connect to Wi-Fi or WLAN connected to the central assessment server 102. Hence, in case a candidate assessment device is lost or stolen, it would be of no use to any one as the lost or stolen devices do not work and would be blocked by the master control device 132. Thus, no one would be able to hack and get access to the network of the central assessment server 102.

It is to be understood that FIG. 1 depicts only two master control devices 132 and four candidate assessment devices 104 for the ease of explanation; however, the same should not be construed as a limitation, and multiple master control devices 132 and multiple candidate assessment devices 104 may be deployed at the test center.

Further, in one implementation, the candidate assessment devices 104 may be a computing device, such as a hand-held device, laptops or other portable computers, tablet computers, mobile phones, PDAs, Smartphone, and the like. In another implementation, the candidate assessment devices 104 may be a standard desktop computer.

Figure 2:
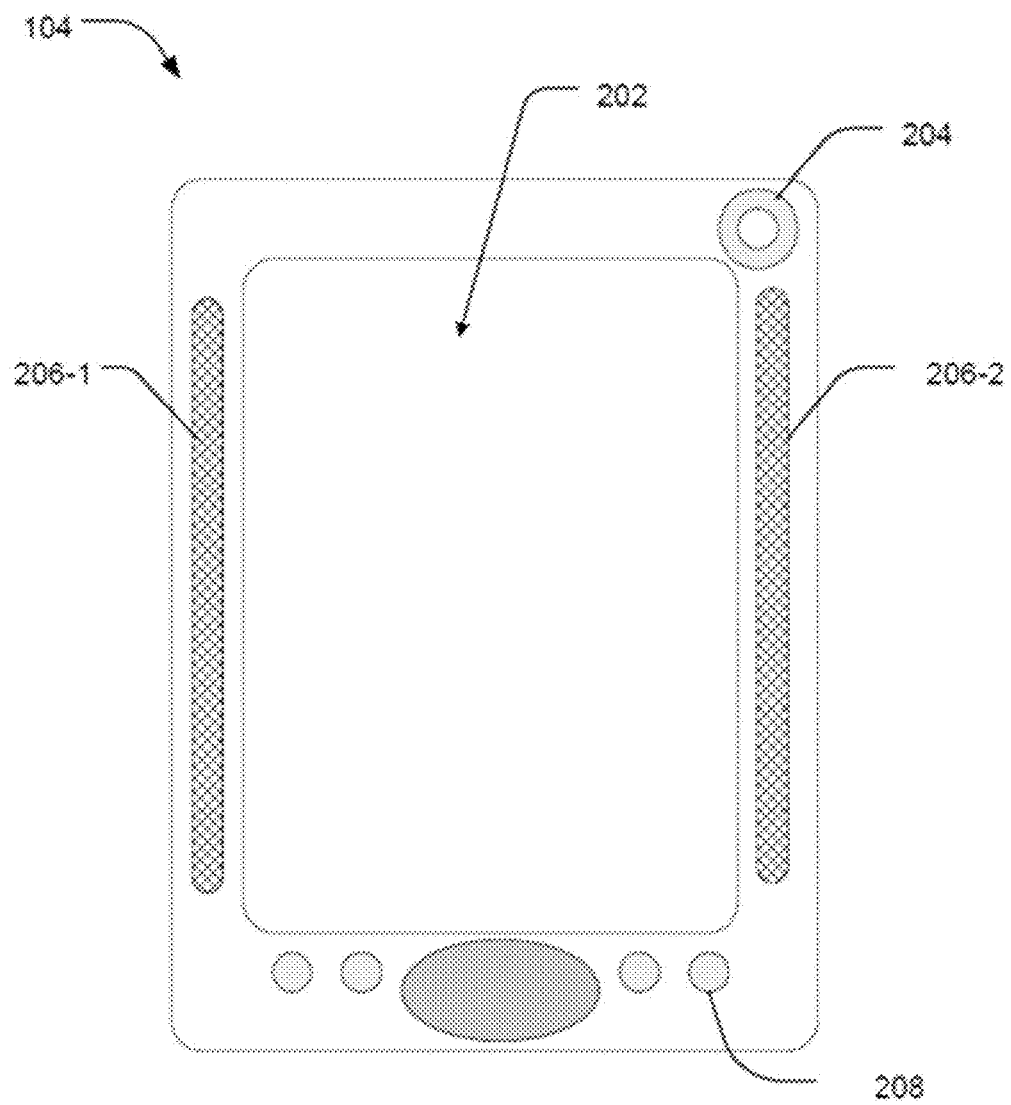
FIG. 2 illustrates a candidate assistance device, in accordance with an embodiment of the present subject matter.

Further, as shown in FIG. 2, each candidate assessment device 104 includes a rigid housing 200, on the panel of which on or more in-built sensors 202 are provided to capture one or more biometric data. The in-built sensors 202 can be print sensors or retinal sensors. Biometric data for such sensors may include, but is not limited to, a finger print, a thumb print, a palm print, or retinal scan. The biometric data is captured by the one or more in-built sensors 202, for identification of a candidate at the beginning of and during the examination. The biometric data is captured at regular predefined time intervals, such as, for example, at the beginning of the examination, during breaks from the examination, periodically during the examination, and at the termination of the examination. In one alternative implementation, the in-built sensors 202 randomly capture the biometric data of the candidate, while the exam is going on. The captured biometric data of the candidate can be later compared with the biometric data of the same candidate, stored as the registration data in the database of the central assessment server 102. In an alternative implementation, the in-built sensors 202 are configured to compare the captured biometric data during the examination with pre-stored biometric data of the at least one candidate captured before the examination. This ensures that the same candidate who has started the exam or register for attending the exam, is giving the exam during the entire duration of the examination.

Further, the candidate assessment device 104 also includes an in-built camera 204 in the front panel of the rigid housing 200. The in-built camera 204 is configured to capture the candidate's image once before the beginning of the examination and storing the same image as the registration data. Thereafter, the in-built camera 204 captures the image of the candidate at predefined time intervals during the examination. In an implementation, the in-built camera 104 is configured to compare the captured still image during the examination with pre-stored still image of the at least one candidate captured before the examination. This helps to have the proof that there was no impersonation and malpractice during the period of examination.

Also, the candidate assessment device 104 includes one or more in-built sound sensitive recorder 206-1, 206-2, collectively referred to as in-built sound sensitive recorder 206, mounted on the rigid housing 200. The in-built sound sensitive recorder 206 is configured to record the surround sound when the sound is more than a permitted limit. The in-built sound sensitive recorder 206 becomes active whenever it receives any sound higher than the permitted limit and records the sound. These sound recordings can be used in investing any issues raised by candidates during the examination. This will also help in capturing any malpractice performed by any candidate during the examination.

Further, the candidate assessment device 104 also includes navigation or controlling keys 208 to control or configure the candidate assessment device 104.

Thus, the aforesaid secured computer based assessment approach, described in accordance with present subject matter, avoids impersonation and malpractices during the examination.

Figure 3:
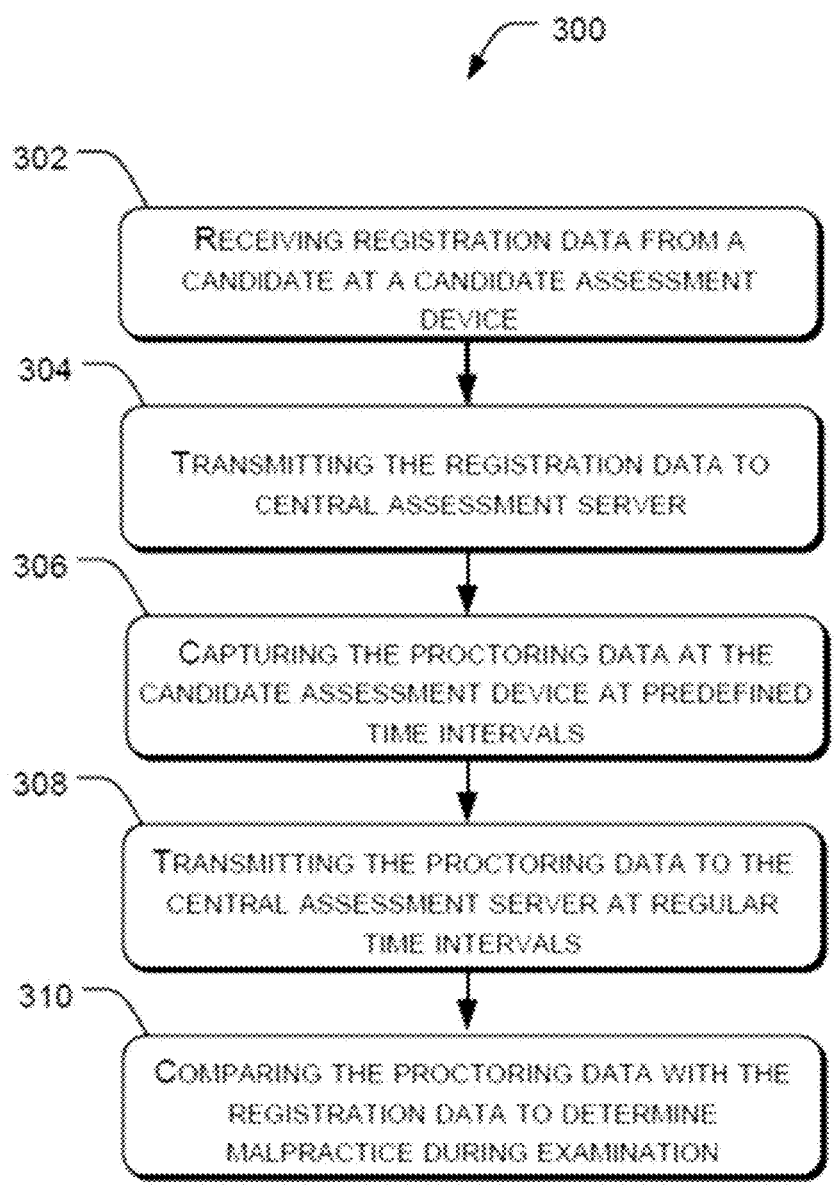
FIG. 3 illustrates a method for conducting a secured computer based assessment, in accordance with an embodiment of the present subject matter.

FIG. 3 illustrates a method 300 for conducting a secured computer based assessment using the secured assessment system 100, in accordance with one embodiment of the present subject matter. The method 300 may be described in the general context of computer executable instructions. The method 300 may be a computer implementable method. Generally, computer executable instructions can include routines, programs, objects, components, data structures, procedures, modules, functions, and the like, that perform particular functions or implement particular abstract data types. The method 300 may also be practiced in a distributed computing environment where functions are performed by remote processing devices that are linked through a communication network. In a distributed computing environment, computer executable instructions may be located in both local and remote computer storage media, including memory storage devices.

The order in which the method is described is not intended to be construed as a limitation, and any number of the described method blocks can be combined in any order to implement the method, or an alternate method. Additionally, individual blocks may be deleted from the method 300 without departing from the spirit and scope of the subject matter described herein. Furthermore, the method 300 can be implemented in any suitable hardware, software, firmware, or combination thereof.

In accordance with an embodiment of the present subject matter, the method 300 may be implemented in the previously described secured assessment system 100. However, it will be appreciated by one skilled in the art that such an implementation is not limiting. The method 300 may be implemented in a variety of such similar systems.

In step 302, registration data from a candidate is received at a candidate assessment device. In an implementation, upon arrival of the aspirants or the candidates at a test center, the candidates are requested to provide the registration data 122 through the candidate assessment devices 104. The registration data 122, as described earlier, may include biometric data, still image, a sample sound associated with the candidates. In order to receive the registration data 122, each candidate assessment device 104 is embodied with an in-built sensor 202, an in-built camera 204, and an in-built sound sensitive recorder 206. In this step 302, a candidate is asked to face the in-built camera for the taking of a still image/picture or a candidate is asked to place his hand or finger on the in-built sensor or screen.

In step 304, the registration data 122 received at the candidate assessment devices 104 is transmitted to the central assessment server 102, in order to register the candidates or validate identity of the candidates based on the registration data 122 previously stored in the central assessment server 102. In case the candidate registration fails for a candidate, the candidate assessment device 104 provided to that candidate gets locked and the candidate is prevented from attending the examination.

In step 306, proctoring data is captured at the candidate assessment device at predefined time intervals. In case the candidate is registered or verified as a valid registrant or candidate, the capturing of proctoring data 124, including biometric data, still image, and sound data, at regular predefined time intervals, begins at candidate assessment devices 104. Further, in case there is no invalidating event, then the test question data is communicated to the candidate assessment device 104 present at the test center. A candidate may attempt the examination by entering the response to the question data displayed on a display screen of the candidate assessment device 104.

In step 308, the captured proctoring data 124 is transmitted to the central assessment server 102. In one implementation, the proctoring data 124 is transmitted to the central assessment server 102 via the master control devices 132.

In step 310, the proctoring data 124 captured by the candidate assessment devices 104 is compared with the registration data 122 using comparison module 116 of the central assessment server 102, to determine malpractice by the candidate during examination. This process of comparison is carried out at regular predefined time intervals, such as at the beginning of an examination, at check-out for breaks, at check-in from breaks, at regular time intervals during examinations, and at the end of an examination. The comparison data 126 outputted by the comparison module 116 is evaluated by the evaluation module 118. If at any point of time, the evaluation of the comparison data 126 for a candidate deviates above a permitted limit, then the capturing of the proctoring data 124 is stopped and/or the master control devices 132 are communicated to block or lock the candidate assessment device 104 allocated to a candidate who is identified for doing malpractices during the examination.

In addition to above method steps, in one step, a tutorial can also be provided either before, or during the examination, to allow the candidates to become familiar with the functioning of the candidate assessment device 104.

Any of the methods described herein can be implemented by computer-executable instructions in one or more computer-readable media (for example, computer storage media or other tangible media). Further, the methods described herein can be implemented in a plurality of programming languages.

Although embodiments for the secured computer based assessment have been described in language specific to structural features and/or methods, it is to be understood that the invention is not necessarily limited to the specific features or methods described. Rather, the specific features and methods are disclosed as exemplary embodiments for secured computer based assessments.

We claim:

1. A method for conducting a secured computer based candidate assessment, the method comprising:

capturing proctoring data by a candidate assessment device of a candidate at predefined time intervals during an examination, wherein the proctoring data comprises one or more of biometric data, still image, and surround sound associated with the candidate, wherein the candidate assessment device is a handheld assessment device, wherein the candidate assessment device is equipped with in-built security features comprising an in-built sensor for capturing the biometric data, an in-built camera for capturing the still image, and an in-built sound sensitive recorder for capturing the surround sound, and wherein the predefined time intervals include at least one of a beginning of the examination, a check-out for breaks, a check-in for breaks, regular time intervals during the examination and an end of the examination;

transmitting, at the predefined time intervals, the proctoring data to a central assessment server communicatively coupled to the candidate assessment device through a master control device connecting the central assessment server and the candidate assessment device, wherein the master control device is configured to act as a wireless router and as a controller for the candidate assessment device;

comparing, at the predefined time intervals, the proctoring data with registration data of the candidate, stored at the central assessment server, to generate comparison data;

evaluating the comparison data at the predefined time intervals to determine malpractice during the examination; and blocking the candidate assessment device during the examination when the evaluation of the comparison data for the candidate deviates above a permitted limit.

2. The method as claimed in claim 1, wherein the capturing the proctoring data is performed by capturing at least one of a finger print, a thumb print, a palm print and a retinal scan of at least one candidate, and the surround sound associated with the at least one candidate.

3. The method as claimed in claim 1 further comprising:

receiving the registration data by the candidate assessment device of the candidate before the beginning of the examination, wherein the registration data includes biometric data, retinal scans, a still image, and sample surround sound associated with the candidate, and wherein the biometric data includes at least one of a finger print, a thumb print, and a palm print of the candidate;

comparing the registration data with previously stored data in the central assessment server, wherein the previously stored data is the data stored by an exam conducting body in the central assessment server prior to the beginning of the examination; and registering the candidate based on the comparison of the registration data and the previously stored data in the central assessment server.

4. The method as claimed in claim 3, further comprising blocking the candidate assessment device before the beginning of the examination when the registration data deviates from the previously stored data in the central assessment server.

5. The method as claimed in claim 3, wherein the registering the candidate comprises:

communicating a test question data to the candidate assessment device; and receiving a response to the test question data at the candidate assessment device.

6. A system for conducting a secure computer based candidate assessment, the system comprising:
a processor; and
memory coupled to the processor, wherein the processor is capable of executing one or more modules stored in the memory, and wherein the one or more modules comprise:
a comparison module to:
receive proctoring data from at least one candidate assessment device at predefined time intervals during an examination through a master control device connecting a central assessment server and the candidate assessment device, wherein the master control device is configured to act as a wireless router and to act as a controller for the at least one candidate assessment device, wherein the proctoring data comprises one or more biometric data, still image, and surround sound associated with at least one candidate, wherein the candidate assessment device is a handheld assessment device, wherein the candidate assessment device is equipped with in-built security features comprising an in-built sensor for capturing the one or more biometric data, an in-built camera for capturing the still image, and an in-built sound sensitive recorder for capturing the surround sound, and wherein the predefined time intervals include at least one of a beginning of the examination, a check-out for breaks, a check-in for breaks, and an end of the examination;
compare the proctoring data with pre-stored registration data, at the predefined time intervals, to generate a comparison data; and
evaluate the comparison data, at the predefined time intervals, to determine malpractice during the examination, and to block the candidate assessment device during the examination when the evaluation of the comparison data associated with the candidate deviates above a permitted limit.

7. The system as claimed in claim 6, wherein the in-built sensor is at least one of a print sensor and a retinal sensor.

8. The system as claimed in claim 6, wherein the registration data includes biometric data, retinal scans, a still image, and a sample surround sound associated with the candidate, and wherein the biometric data comprises at least one of a finger print, a thumb print, and a palm print of the at least one candidate.

9. The system as claimed in claim 7, wherein the in-built sensor is configured for capturing the one or more biometric data associated with the at least one candidate, at the predefined time intervals during the examination.

10. The system as claimed in claim 7, wherein the in-built camera is configured to compare the captured still image during the examination with a pre-stored still image of the at least one candidate captured before the examination.

11. A non-transitory computer-readable medium having embodied thereon a computer program for executing a method comprising:
capturing proctoring data by a candidate assessment device of a candidate at predefined time intervals during an examination, wherein the proctoring data comprises one or more of biometric data, still image, and surround sound associated with the candidate, wherein the candidate assessment device is a handheld assessment device, wherein the candidate assessment device is equipped with in-built security features comprising an in-built sensor for capturing the one or more biometric data, an in-built camera for capturing the still image, and an in-built sound sensitive recorder for capturing the surround sound, and wherein the predefined time intervals include at least one of a beginning of the examination, a check-out for breaks, at a check-in for breaks, and an end of the examination;
transmitting, at the predefined time intervals, the proctoring data to a central assessment server communicatively coupled to the candidate assessment device through a master control device connecting the central assessment server and the candidate assessment device, wherein the master control device is configured to act as a wireless router and as a controller for the candidate assessment device;
comparing, at the predefined time intervals, the proctoring data with registration data of the candidate, stored at the central assessment server to generate comparison data;
evaluating the comparison data at the predefined time intervals to determine malpractice during the examination; and
blocking the candidate assessment device during the examination when the evaluation of the comparison data associated with the candidate deviates above a permitted limit.

12. The non-transitory computer-readable medium as claimed in claim 11, wherein the capturing the proctoring data is performed by capturing at least one of a finger print, a thumb print, a palm print and a retinal scan of the candidate, wherein the registration data includes biometric data, retinal scans, a still image, and sample surround sound associated with the candidate, and wherein the biometric data includes at least one of a finger print, a thumb print, and a palm print of the candidate.

* * * * *